J. W. Burch.
Cotton Cultivator.

No. 97,870. Patented Dec. 14, 1869.

Witnesses

Inventor
J. W. Burch

UNITED STATES PATENT OFFICE.

ISAAC W. BURCH, OF FAYETTE, MISSISSIPPI.

IMPROVEMENT IN COTTON-CULTIVATORS.

Specification forming part of Letters Patent No. 97,870, dated December 14, 1869.

*To all whom it may concern:*

Be it it known that I, I. W. BURCH, of Fayette, in the county of Jefferson and State of Mississippi, have invented a new and useful Improvement in Cotton-Cultivators; and I do hereby declare that the following is a full, clear, and exact description thereof, which will enable those skilled in the art to make and use the same, reference being had to the accompanying drawings, forming part of this specification.

The object of this invention is to provide a simple and efficient machine for cultivating cotton.

The invention comprises a pair of plows suspended from the frame of a truck, so as to work on both sides of the row for "baring off" or separating the weeds and earth away from the row; also, a pair of rotary cutters having oblique blades for throwing away from the plants, and designed also to work on both sides of the rows and closer to the plants than the plows, both sets of devices having vertical vibration, and otherwise arranged as hereinafter more fully specified.

Figure 1:
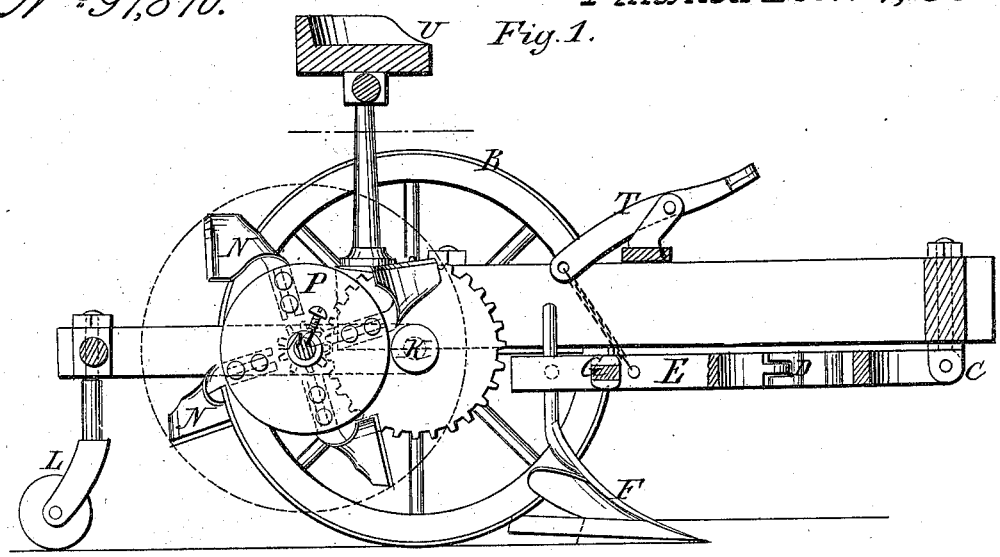
Figure 2:
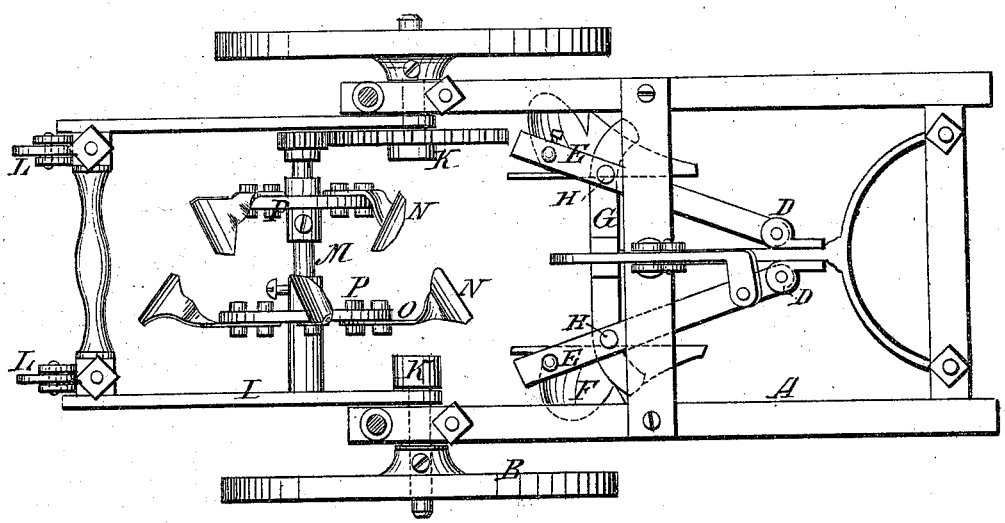

Figure 1 represents a longitudinal sectional elevation of my improved machine, and Fig. 2 represents a plan view of the same.

A represents a strong wood frame mounted on two wheels, B, under the front of this frame, and attached to a ᐱ-shaped frame having vertical vibration on the pivots e, the bars F of which frame are adjustable on the parts D out or in, are connected to plows E at a considerable distance apart, and adapted to work on each side of the row and to turn the soil, weeds, &c., from the row. The said arms E may be secured on the transverse curved arms G at different points by set-screws H, for varying the distance between them. These plows are intended to take broad and shallow furrows near the center of the space between the rows, cutting the weeds and turning them and the clods into rows at the center of the said spaces.

I represents a rear frame pivoted to the short axle K of the wheels B and projecting rearward, being supported at the rear by caster-wheels L. In this frame, behind the axle, is mounted a transverse shaft, M, whereon rotary oblique cutters N are mounted by connecting the shank O thereof to disks P, which are adjustable to or from each other. These cutters are rotated by gear-wheels deriving motion from one of the wheels B, and revolve in planes parallel with the rows, one set on each side. They work considerably closer to the rows than the plows, and are intended to scrape or cut off the ends and the plants at the sides as close thereto as possible and to throw them away from the plants preparatory to the operation of the chopping-out machine. The said cutters may be made to revolve in either direction; but I prefer to arrange them to turn in the direction opposite to that on which the wheels B work.

T represents a lever for raising the plows F for passing over obstructions by pressing upon it with but while sitting on the seat V.

Having thus described my invention, what I claim as new, and desire to secure by Letters Patent, is—

1. A cotton-cultivator having adjustable beams E, vibrating on joints C in the front part of the frame, and adjustable as to their distances apart in the manner described.

2. A cotton-cultivator provided with a vibrating frame, I, and rotary cutters N, arranged as described, to cut close to the plant and cultivate on each side thereof, as set forth.

3. A cotton-cultivator, with a pair of plows, F F, to work on both sides of the row, and arranged in front of the frame, combined with a series of oblique cutters, N N, on the hinder part thereof, arranged to rotate on disks at a less distance apart than the plows, and to clean up close to the plants, all as shown and described.

4. The combination, with the frame A, mounted on wheels B, of the vibrating frame I and rotary oblique cutters N, arranged for adjustment and for operation substantially as specified.

ISAAC W. BURCH.

Witnesses:
 DAVID HARRISON,
 WM. F. SCHWING.